(12) United States Patent
Chen

(10) Patent No.: US 9,045,197 B2
(45) Date of Patent: Jun. 2, 2015

(54) BOAT SEAT BASE ASSEMBLY

(71) Applicant: Kate Chen, Corinth, TX (US)

(72) Inventor: Kate Chen, Corinth, TX (US)

( * ) Notice: Subject to any disclaimer, the term of this patent is extended or adjusted under 35 U.S.C. 154(b) by 305 days.

(21) Appl. No.: 13/761,668

(22) Filed: Feb. 7, 2013

(65) Prior Publication Data
US 2014/0216327 A1  Aug. 7, 2014

(51) Int. Cl.
B63B 17/00 (2006.01)
B63B 29/02 (2006.01)
A47C 4/02 (2006.01)
F16B 12/14 (2006.01)
B63B 29/04 (2006.01)
F16B 5/02 (2006.01)
F16B 35/04 (2006.01)

(52) U.S. Cl.
CPC .............. B63B 17/00 (2013.01); B63B 29/04 (2013.01); B63B 2029/043 (2013.01); A47C 4/02 (2013.01); A47C 4/021 (2013.01); F16B 5/0275 (2013.01); F16B 12/14 (2013.01); F16B 35/041 (2013.01)

(58) Field of Classification Search
CPC .. B63B 17/00; B63B 29/04; B63B 2029/043; A47C 4/00; A47C 4/02; A47C 4/021; A47C 4/028; A47C 7/02; A47C 7/021; A47C 7/16; F16B 5/0275; F16B 2012/103; F16B 2012/106; F16B 12/14; F16B 12/24; F16B 35/04; F16B 35/041; F16B 35/042
USPC ............ 114/363; 297/440.1, 440.13–440.22, 297/451.8; 411/388, 389
See application file for complete search history.

(56) References Cited

U.S. PATENT DOCUMENTS

| | | | |
|---|---|---|---|
| 2,801,895 A | 8/1957 | Gass | |
| 3,030,146 A * | 4/1962 | Faxon | 297/411.45 |
| 3,090,086 A | 5/1963 | Fata | |
| 3,221,348 A * | 12/1965 | Siegel | 5/28 |
| 3,664,011 A | 5/1972 | Labastrou | |
| 3,685,063 A * | 8/1972 | Morgan | 5/400 |
| 3,897,713 A * | 8/1975 | Gugle | 411/389 |
| 4,157,674 A * | 6/1979 | Carlson et al. | 411/389 |
| 4,223,585 A * | 9/1980 | Barth et al. | 411/389 |
| 4,909,177 A | 3/1990 | Jones | |
| 5,154,134 A | 10/1992 | Goldsmith | |
| 5,475,960 A | 12/1995 | Lindal | |
| 7,930,988 B1 | 4/2011 | Chen | |

* cited by examiner

Primary Examiner — Ajay Vasudeva
(74) Attorney, Agent, or Firm — Howison & Arnott, LLP

(57) ABSTRACT

A boat seat base assembly includes a pair of opposed side panels and a pair of opposed end panels joined to the side panels by means of shaped connecting members formed in one of the side panels and end panels and shaped apertures formed in one of the side panels and end panels wherein the shaped connecting members are slideably received in the shaped apertures with an interference between the shaped connecting members and the shaped apertures.

14 Claims, 7 Drawing Sheets

BOAT SEAT BASE ASSEMBLY

TECHNICAL FIELD

The invention relates to a boat seat base assembly, and in particular, a base assembly that can be economically transported in an un-assembled state and readily assembled with a minimum of tools.

BACKGROUND

Watercraft seats and seat components are often subjected to environmental conditions that, for all practical reasons, require the seats and components to be manufactured from materials that are resistant to degradation from exposure to moisture, heat and UV radiation for long periods of time. Supports or bases for water craft seats need to be durable, impact resistant, rigid and mechanically strong enough to support significant loads. Preferably, materials selected for water craft seats should also be abrasion resistant and resistant to chemical attack from various chemicals such as salt, degreasers, cleaners and the like. These requirements are typically met with moldable plastic materials.

In the case of a bench-type water craft seat, it may be desirable to use a base for the seat that has a rectangular, box-like geometry to provide storage space beneath the seat cushion as well as to provide a seat having the required rigidity and mechanical strength. However, it is also desirable that the base be manufactured in a form, such as individual panels, that can be economically transported from a fabrication facility to a location where the base is sold and/or assembled. Once a user is ready to assemble the base, the panels can preferably be assembled together rapidly with a minimum number of tools and fasteners.

SUMMARY

In one embodiment, a base assembly for a boat seat includes a pair of opposed side panels, a pair of opposed end panels and a plurality of interior supports or support walls. Each of the side panels includes a planar outer surface, a planar inner surface, an upper edge, a lower edge and opposed end edges. A first flange having a width of D1 extends continuously along the upper edge of the side panel and perpendicular to the planar outer surface of the side panel. In one variation, the first flange of the side panel includes at least two spaced apart recessed portions separated by linear non-recessed portions of the upper edge and the first flange. The spaced apart recessed portions extend along co-extensive portions of the upper edge and first flange and have a horizontal bottom wall that extends parallel to non-recessed portions of the first flange. Angled connecting walls extend between the bottom wall of the recessed portion and the non-recessed portions of the first flange. A second flange, spaced apart from the first flange, extends longitudinally between the end edges of the sidewalls parallel to the first flange perpendicular to and away from the planar outer surface of the side panel. The second flange includes a plurality of spaced apart slots, the slots extending parallel to the inner edge of the second flange and at least two, spaced apart, T-shaped apertures. The T-shaped apertures or openings each have a first leg extending into the second flange from an inner edge of the flange and a second leg joined to and perpendicular to the first leg whereby the first leg opens into the second leg.

In one aspect, the side panels of the boat seat base assembly are provided with at least two spaced apart supports, each having first and second spaced apart support walls that extend perpendicular to the second flange between the second flange and the lower edge of the side panel. A plurality of cross members extend between and are perpendicular to the support walls with each of the cross member having a T-shaped aperture opening extending into the cross member with the T-shaped openings of the cross members being vertically aligned with the T-shaped opening of the second flange for receiving a T-shaped member therethrough.

The side panels also include side support pillars joined to the side panel end edges. Each of the side support pillars has a T-shaped aperture or opening extending from an upper end of the side support pillar to a lower end wall of the side support pillar. The T-shaped apertures of the side support pillars open upwardly to receive a T-shaped member inserted through the opening in the cross-members and the second flange.

The end panels of the base assembly are configured with end support pillars extending between the upper and lower edges of the end panel. Each of the end support pillars includes a T-shaped connecting end member joined to the opposed end edges of the end panel. Each of the T-shaped connecting end members has dimensions corresponding to the dimensions of the T-shaped openings of the side support pillars of the side panels such that the side panels are mechanically connected by the end panels when the shaped connecting end members of the end panels are received in the T-shaped openings of the side support pillars of the side panels.

In one aspect, the base assembly is provided with one or more interior support panels that extend between the side panels of the assembly. The interior support panels each have opposed, T-shaped end members joined to and extending along the length of opposed sidewalls of the interior support member. Each of the T-shaped end members has a neck joined to and extending from the lower end of the sidewall of the support with a substantially rectangular portion joined to and extending from the neck along the length of the neck to form a T-shaped member. The substantially T-shaped cross-section of the shaped end members of the supports have dimensions corresponding to the dimensions of the T-shaped openings of the cross members of the side panels of the base assembly. The interior support panels are connected to the side panels when the T-shaped end members are received in the T-shaped openings of the cross members and the T-shaped openings of the second flange of the side panels.

In one variation, the dimensions and cross-sections of T-joints between the side panels and end panels are substantially identical to the joints between the dimensions and cross-sections of T-shaped joints between the side panels and interior reinforcing panels. These dimensions and tolerances are set to create a tight, friction or interference fit between the T-shaped end members and the T-shaped openings so that when shaped end members are slidingly engaged through the T-shaped openings, the side panels, end panels and interior support panels are secured together without the use of additional fasteners to hold the panels together. The resulting structure is rigid, durable and can support a significant load when assembled with a boat seat.

In another aspect, a boat seat including a base assembly including a pair of opposed side panels, at least one of the side panels including a connecting flange with at least one slot formed in the flange. A pair of opposed end panels are joined to the side panels by means of shaped connecting members formed in one of the side panels and end panels. Shaped apertures are formed in one of the side panels and end panels with the shaped connecting members being slideably received in the shaped apertures. The boat seat further includes a bench type cushion and a back cushion. The back cushion has a support strip positioned adjacent a longitudinal lower edge of the back cushion with at least one aperture formed in the strip.

A threaded insert is positioned in the aperture for receiving a connecting stud. The connecting stud is configured with first and second threaded portions and a collar formed around the stud midway along the length of the stud between the first and second threaded portions. The first threaded portion of the connecting stud is received in the threaded insert and the second portion of the connecting stud is received in the slot. A threaded nut is engaged with the second portion of the connecting stud to secure the second portion in the slot. The collar is thereby positioned between the support strip and the connecting flange such that the collar prevents push through of the threaded insert past the connecting flange.

BRIEF DESCRIPTION OF THE DRAWINGS

For a more complete understanding, reference is now made to the following description taken in conjunction with the accompanying Drawings in which.

DETAILED DESCRIPTION

Figure 1:
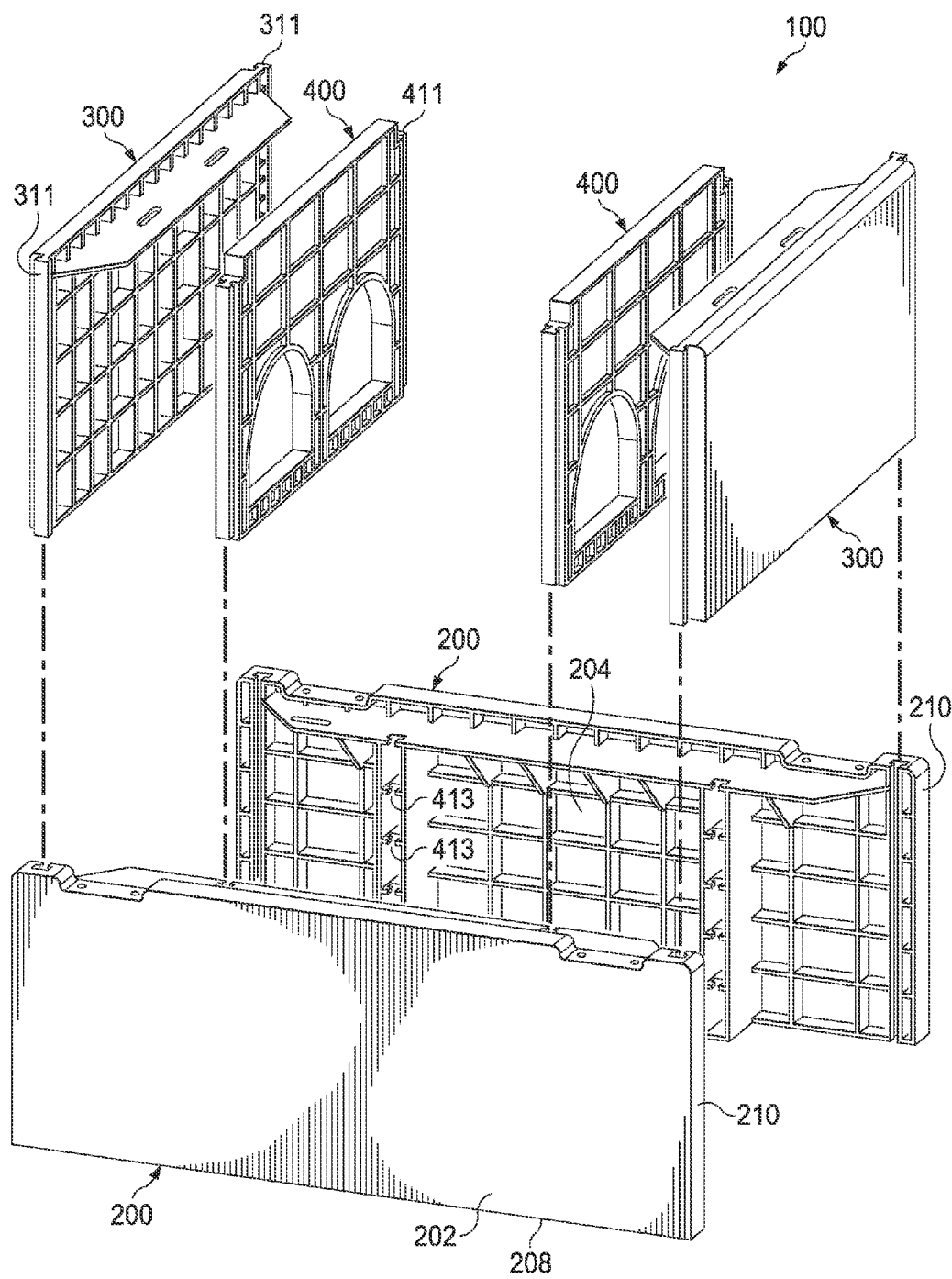
FIG. 1 is an exploded view of a boat seat base assembly as described herein.

Referring now to the drawings, wherein like reference numbers are used herein to designate like elements throughout, the various views and embodiments of a boat seat base assembly are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 is a partial perspective cut-away view of a base assembly 100 for a boat seat as disclosed herein. The base assembly 100 includes a pair of opposed side panels 200, a pair of opposed end panels 300 and a plurality of interior support panels 400. As set forth in greater detail below, the panels 200, 300 and 400 are joined together by means of a T-joint system including projecting shaped members and corresponding T-shaped openings having the same cross-section as the shaped members. Panels 200, 300 and 400 may be formed from a suitable molded plastic and may include additives such as stabilizers, colorants, etc. Panels 200, 300 and 400 may include various structural features such as reinforcing ribs and other features designed to strengthen the base and facilitate assembly and disassembly.

Figure 2:
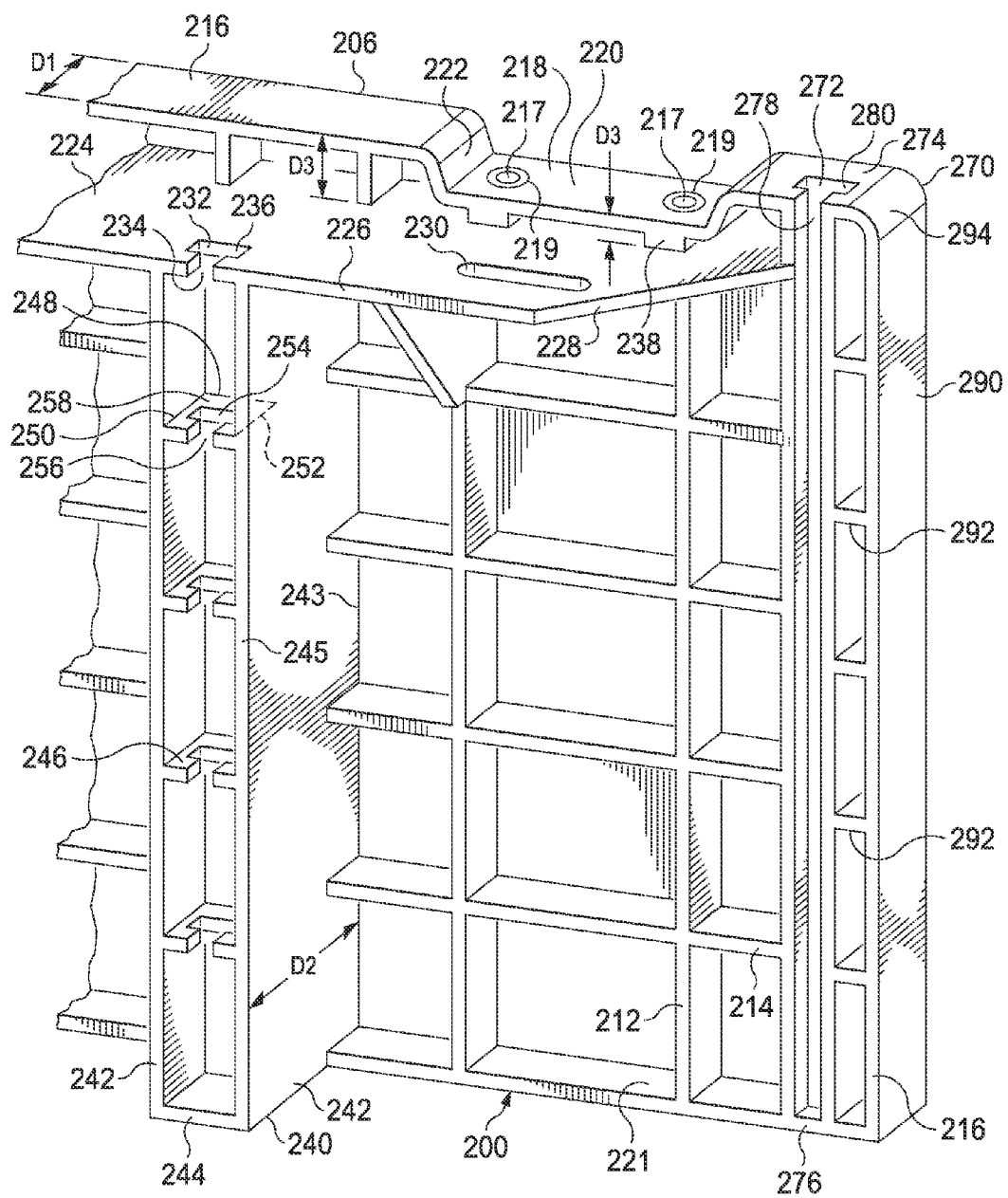
FIG. 2 is a partial perspective view of a side panel of the boat seat base assembly of FIG. 1.
Figure 3:
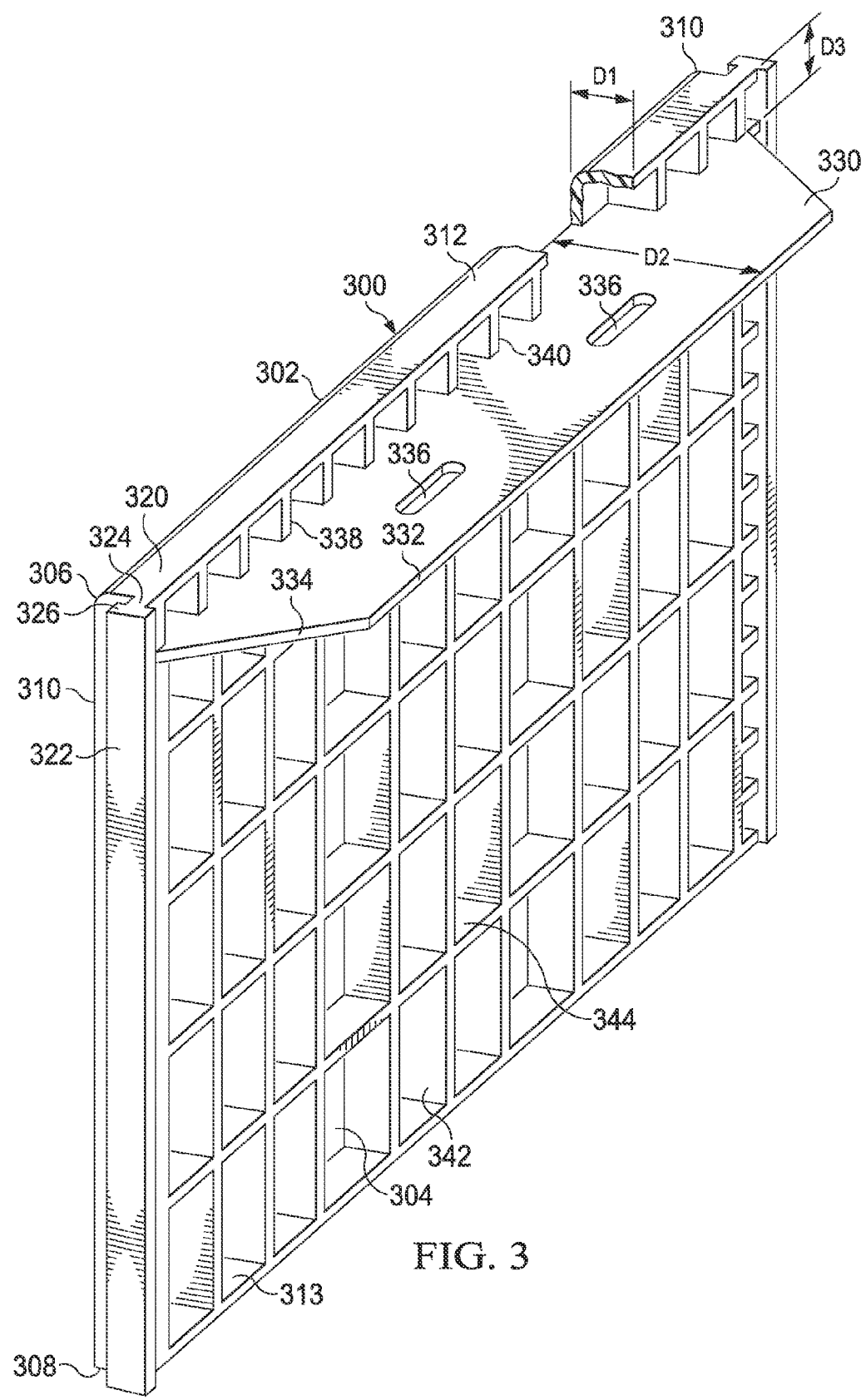
FIG. 3 is a partial perspective view of an end panel of the boat seat base assembly of FIG. 1.

FIG. 2 is a partial perspective view of a side panel 200 for use in the base assembly of FIG. 1. Referring to FIGS. 1-3, side panel 200 includes a planar outer surface 202, a planar inner surface 204, an upper edge 206, a lower edge 208 and opposed end edges 210. In the illustrated embodiment, a plurality of vertical reinforcing ribs 212 and horizontal reinforcing ribs 214 extend inwardly from the planar inner surface of panel 200. Panel 200 includes a first flange 216 having an upper surface and a lower surface and extending continuously along the upper edge of the side panel. The first flange 216 has a first width D1 and extends perpendicular to and away from the planar outer surface. In one embodiment, upper edge 206 and first flange 216 of the side panel includes at least two spaced apart recessed portions 218 separated by linear non-recessed portions of the upper edge and first flange. Recessed portions 218 are configured to accommodate mounting hinges, flanges or other mounting hardware for mounting seats (not shown) on base 100. Spaced apart recessed portions 218 extend along co-extensive portions of the upper edge and first flange of side panel 200. Each of recessed portions 218 includes a horizontal bottom wall 220 extending parallel to non-recessed portions of the upper edge and first flange 216. Each of the spaced apart recessed portions 218 include angled connecting walls 222 extending between the bottom wall of the recessed portion 200 and the non-recessed portions of the upper edge 206 and first flange 216 of side panel 200.

As illustrated, a second flange 224, spaced apart from and located below first flange 216, extends longitudinally and continuously between the end edges 210 of side panel 200. Second flange 224 has a second width D2, greater than D1, and extends perpendicular to and away from the planar outer surface 202. Second flange 224 has an inner edge joined continuously along the length thereof to the planar inner surface 204 of side panel 200. The distance between the upper surface of the non-recessed portion of first flange 216 and the upper surface of the second flange 224 is D3. Second flange 224 includes an outer edge 226 and angled end edges 228 between the inner edge and outer edge of the second flange. Second flange 224 may be configured as a connecting flange adapted to connect a boat cushion to side panel 200 as described hereinafter.

Second flange 224 including a plurality of spaced apart slots 230 that extend parallel to outer edge 226 of the second flange. In the illustrated embodiment, a first one of slots 230 is located midway along the length of second flange 224 with second and third slots 230 positioned adjacent angled end edges 228 of the second flange. Slots 230 provide a connection point where screws or bolt may be employed to fasten a seat or cushion to base assembly 100.

At least two, spaced apart, shaped apertures 232 are formed in second flange 224. Each of apertures 232 includes a first leg 234 extending into the second flange 224 from the outer edge thereof and a second leg 236 joined to and perpendicular to the first leg. As illustrated, first leg 232 opens into second leg 236 to form a T-shaped opening in second flange 224. A plurality of support columns 238 extend between the lower surface of horizontal bottom wall 220 and the upper surface of second flange 224. An open ended screw or bolt receiving hole 217 extends through each of the support columns 238, second flange 224 and horizontal bottom wall 220 for receiving screws or bolts therein. A cylindrical insert 219 may be provided in screw receiving hole 217 to facilitate fastening a hinge, mounting bracket or other hardware fixture to base 100. Insert 219 may be formed from metal or another suitable material and may be provided with internal and/or external threads.

Side panel 200 includes at least two spaced apart supports 240, each of the supports including first and second spaced apart support walls 242. First and second support walls 242 extend perpendicular to second flange 224 between the second flange and the lower edge of side panel 200 with the upper edge of each of the support walls being joined to the lower surface of the second flange. A first longitudinal edge 243 of each of support walls 242 is joined to the planar inner surface 204 of side panel 200. A second longitudinal edge 245 of support wall 242 extends parallel to the first longitudinal edge of the support wall with a lower edge of the support wall extending perpendicular to and between first and second longitudinal edges 243, 245 of the support wall. Spaced apart supports 240 each have a bottom wall 244 joined to the planar inner surface of side panel 200 along the length of the bottom wall. Bottom wall 244 is also joined to the lower edges of support walls 242 along the length of the bottom wall such that the bottom wall extends continuously between the lower edges of support walls 242. In one variation, side panel 200 includes a third, bottom flange 221 that extends continuously along the lower edge 208 of the side panel. The third flange 221 also has a width D1 and extends perpendicular to and away from the planar outer surface 202.

Each of supports 240 has a plurality of cross members 246 extending between and perpendicular to support walls 242. Cross members 246 each having a first edge 248 joined to the inner planar surface of side panel 200, opposed second edges 250 joined to support walls 242 and a third edge 252. Cross members 246 each have a shaped aperture 254 comprising a first leg 256 extending into the cross member from the third edge 252 and a second leg 258 joined to and perpendicular to the first leg so that the first leg opens into the second leg to form a T-shaped opening. The T-shaped openings of cross members 246 are aligned with the T-shaped opening of second flange 224 for receiving a T-shaped member through the second flange and the cross members.

Opposed side support pillars 270, joined to the side panel end edges 210 along the length of the end edges, extend between the upper and lower edges, 206, 208 of side panel 200. Each of side support pillars 270 include a shaped aperture 272 extending from an upper end 274 of the side support pillar to a lower end wall 276 of the side support pillar. Shaped aperture 272 includes a first leg 278 extending into the end support pillar from an inner side thereof and a second leg 280 joined to and extending perpendicular to the first leg. First leg 278 of shaped aperture 272 opens into second leg 280 to form a continuous, longitudinally extending T-shaped opening that opens upwardly to receive a T-shaped member through side support pillar 270.

In one variation, side panels 200 also include opposed side end reinforcing walls or end flanges 290 that are connected along an outer edge thereof to side panel end edges 210 of side panels 200. End flanges 290 include curved end portions 294 that connect the end flanges to support pillars 270. End flanges 290 each have a width D1. As illustrated, a plurality of side reinforcing members 292 having a width D1 are disposed between each end flange 290 and the corresponding side support pillar 270 at equal, spaced apart intervals along the length of the end flange. Side reinforcing members 292 are joined to planar inner surface 204 of side panel 200 along an inner edge of the side reinforcing members and to end flange 290 and to side support pillar 270 along side edges of the side reinforcing members.

FIG. 3 is a partial perspective view of an end panel 300 for use in the base assembly of FIG. 1. Opposed end panels 300 are configured to fit between side support pillars 270 of side panels 200 and mechanically inter-lock the side panels together such that base assembly 100 may be readily assembled with few or no tools. End panels 300 each include a planar outer surface 302, a planar inner surface 304, an upper edge 306, a lower edge 308 and opposed end edges 310. A first flange 312 having an upper surface and a lower surface extends continuously along the upper edge of the end panel. First flange 312 has a first width D1 and extends perpendicular to and away from the planar outer surface 302 of end panel 300.

End support pillars 320, joined to end edges 310, extend continuously between the upper and lower edges 306, 308 of end panel 300. Each of the end support pillars 320 includes a shaped end member 322 joined to and extending along the length of opposed end edges 310 of end panel 300. Each of shaped end members 322 has a neck 324 joined continuously along the length of the member to end edges 310 of end panel 300. A substantially rectangular portion 326 is joined to and extends from neck 324 along the length of the neck. In one embodiment, rectangular portion 326 is longer than neck 324, for example, rectangular portion 326 may be fifty percent longer than neck 324 with a longitudinal axis of the rectangular portion extending perpendicular to neck 324. Rectangular portion 326 is joined to neck 324 midway along the length of the rectangular portion such that shaped end member 322 has a substantially T-shaped cross-section. The dimensions of the T-shaped cross-section of shaped end member 322 are approximately equal to and correspond to the dimensions of the T-shaped openings of side support pillars 270 of side panels 200.

The side panels are mechanically coupled to end panels 300 when the shaped end members 322 of the end panels are received in sliding engagement in the T-shaped openings of the side support pillars 270 of the side panels 200 to form a vertical joint 311 that extends substantially over the height of the side and end panels 200, 300. In one variation, the upper ends of shaped end members 322 are flush with the upper surface of first flange 216 of side panels 200 when the shaped members are fully inserted into T-shaped openings of side support pillars 270 of the side panels.

The dimensions and tolerances of the shaped end member 322 of end panels 300 and shaped aperture 272 of side panels 200 are set to create a tight, friction or interference fit between the end members and the aperture such that insertion of shaped end member 322 into and through shaped aperture 272 during assembly of base 100 requires significant force. Similarly, removal of shaped end member 322 from shaped aperture 272 requires significant force. Side panels 200 and end panels 300 are thereby securely engaged upon assembly of base 100 without the use of fasteners to hold the panels together.

End panel 300 includes a second flange 330, spaced apart from and located below first flange 312 that extends longitudinally and continuously between the end edges 310 of the end panel. Second flange 330 has a second width D2, greater than D1, and extends perpendicular to and away from the planar outer surface 302 of end panel 300. Second flange 330 has an inner edge joined continuously along the length thereof to the planar inner surface 304 of end panel 300. The distance between the upper surface of first flange 312 and the upper surface of the second flange 330 is D3. Second flange 330 includes an outer edge 332 and angled end edges 334 between the inner edge and outer edge of the second flange. In the illustrated embodiment, end edges 334 are angled away from outer edge 332 at an angle of approximately forty-five degrees. Similarly, angled end edges 228 of second flange 224 of side panel 200 are angled away from outer edge 226 between the inner edge and outer edge of second flange outer edge 226 at an angle of approximately forty-five degrees. When an end panel 300 is assembled with a side panel 200 of assembly 100, end edges 228 and end edges 334 of second flanges 224, 330 are positioned in abutting relation as illustrated in FIG. 1. When angled end edges 228 and angled end edges 334 of second flanges 224, 330 are abutted together, second flanges 224 and 330 resist forces that would otherwise apply torque to the joint formed by shaped end member 322 of end panels 300 and shaped aperture 272 of side panels 200. The geometry of angled end edges 228 and angled end edges 334 of second flanges 224, 330 thereby aids in keeping side panels 200 at right angles to end panels 300, strengthening and maintaining the rigidity of base assembly 100.

End panel 300 may also have a third, lower flange 313 that extends along the length of lower edge 308 of the end panel 300. Third flange 313 also has a width D1 and extends perpendicular to and away from the planar outer surface 302 of the end panel 300.

As illustrated, second flange 330 of end panel 300 includes a plurality of spaced apart slots 336 (two shown) that extend parallel to the outer edge 332 of the second flange 330. In one variation, a plurality of reinforcing bars 338 extend vertically between the upper surface of second flange 330 and the lower surface of first flange 312 and horizontally from inner planar surface 304 of end panel 300 to the inner edge 340 of the first flange at equally spaced intervals along the length of second flange 330. End panel 300 may also be provided with vertical and horizontal reinforcing ribs 342, 344 that extend inwardly from planar inner surface 304.

Figure 4:
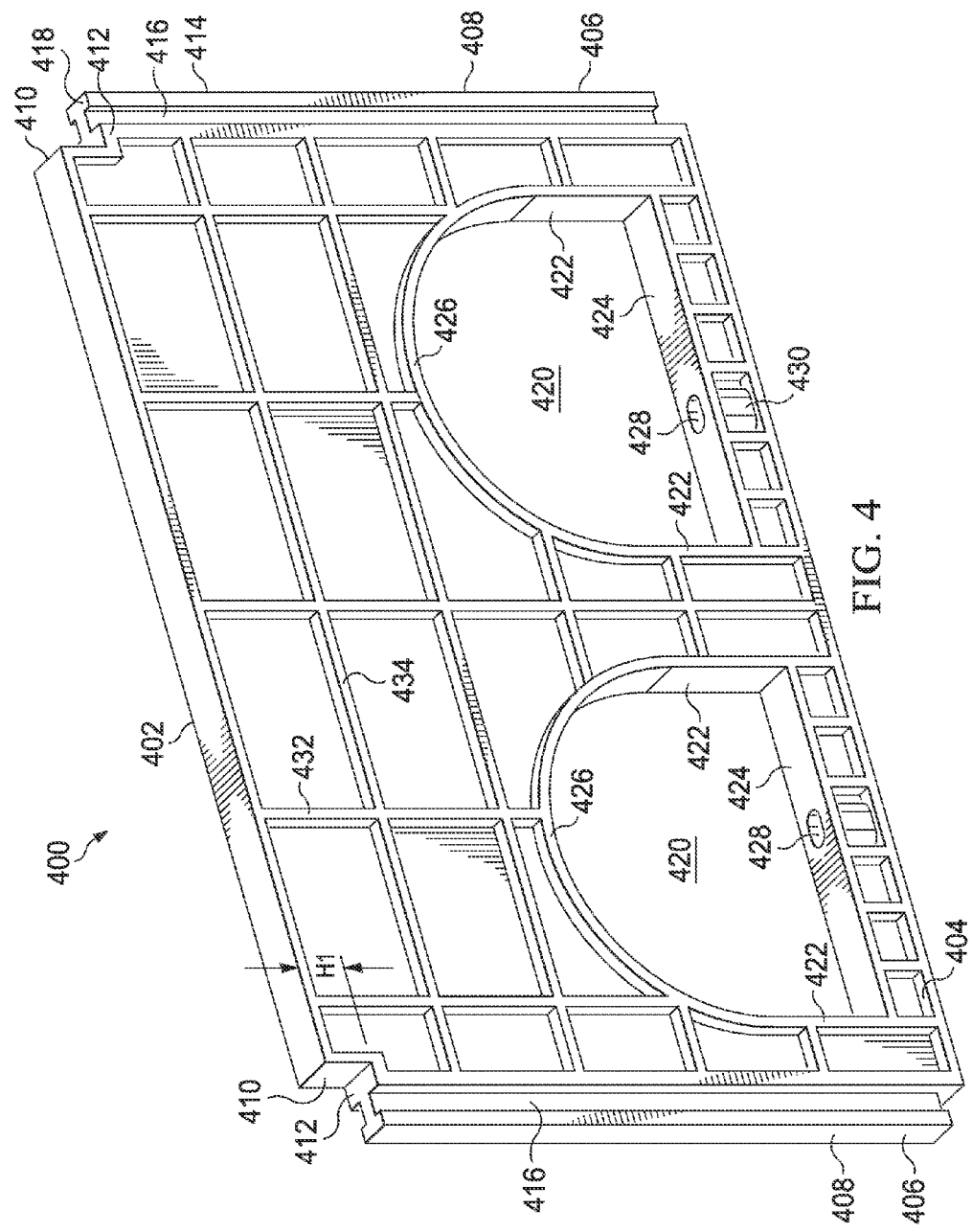
FIG. 4 is a partial perspective view of an interior support panel of the boat seat base assembly of FIG. 1.

FIG. 4 is a partial perspective view of an interior reinforcing panel 400 for use in the base assembly of FIG. 1. Base assembly 100 may be provided with a plurality of spaced apart interior reinforcing panels 400, each of which has an upper wall 402, a lower wall 404 and opposed side walls 406. Opposed side walls 406 each include a lower portion 408 and an indented upper portion 410 and a horizontal connecting wall 412 extending perpendicular to and joined to the lower portion of the side wall and the indented upper portion of the side wall at opposed ends of the connecting wall. Indented upper portion 410 of each side wall has a height H1 substantially equal to D3. A planar support wall 411 (FIG. 1) extends between, and is joined to, upper wall 402, a lower wall 404 and opposed side walls 406 continuously along the edges of the planar support wall.

Interior reinforcing panels 400 each including opposed shaped end members 414 joined to and extending along the length of lower portions 408 of opposed sidewalls 406 of the interior support member. Each shaped end member 414 includes a neck 416 joined to and extending from lower portion 408 of sidewall 410 along the length of the shaped end member. A substantially rectangular portion 418 is joined to and extends from neck 416 over the length of the shaped end member. Neck 416 and rectangular portion 418 form substantially T-shaped end member 414. Shaped end member 414 has a cross-section with dimensions corresponding to the dimensions of the T-shaped openings 232 of second flange 224 and T-shaped openings 254 of supports 240 of side panels 200. Insertion of shaped end member 414 into and through T-shaped openings 232, 254 forms a series of vertically aligned joints 413 (FIG. 1) between reinforcing panels 400 and side panels 200 having cross-sectional dimensions substantially equal to the dimensions of joint 311 between side panels 200 and end panels 300. In one variation, the upper ends of shaped end members 414 are flush with the upper surface of second flange 224 of side panels 200 when the shaped end members are fully inserted through T-shaped openings 232, 254 of the side panels.

The dimensions and tolerances of the shaped end member 414 of reinforcing panels 400 and T-shaped openings 232, 254 of side panels 200 are set to create a tight, friction or interference fit between the shaped end members and the openings so that when shaped end member 414 is slidingly engaged through shaped openings 232, 254, during assembly of base 100, reinforcing panels 400 are securely engaged with side panels 200. In this manner, side panels 200 and reinforcing panels 400 are secured together upon assembly of base 100 without the use of fasteners to hold the side panels together with the supports.

In the illustrated embodiment, reinforcing panels 400 include a plurality (2 illustrated) of spaced apart openings 420, each having opposed parallel side flanges 422, with a horizontal flange 424 extending perpendicular to side flanges 422 and a curved upper flange 426 extending between the side flanges. In one variation, curved upper flange 426 is semicircular. Each of flanges 422, 424 and 426 is joined continuously to planar support wall 411 (FIG. 1) midway across the width of the flanges. An elongated slot 428 is formed through horizontal bottom flange 424, through a reinforcing column 430 and through bottom wall 404 of interior support 400 in each of spaced apart openings 420. Slots 428 provide a connection point for connecting base assembly 100 to a deck or floor of a boat with screws, bolts or another elongate fastener. Interior reinforcing panels 400 may also be provided with a plurality of spaced-apart vertical and horizontal reinforcing ribs 432, 434, respectively, to enhance the rigidity and strength of the panels.

Although the boat seat base as described above utilizes a t-joint system for assembly, joints having other geometries may be utilized. As used herein, the terms "shaped member," "shaped connecting member" and "shaped aperture" describe a joint system wherein a shaped connecting member has a neck joined to a second portion having at least one cross-sectional dimension greater than the neck. The shaped aperture has a leg and a second portion with dimensions corresponding to the shaped connecting member such that the joint may be assembled by sliding the shaped member into the shaped aperture. The second portion of the shaped connecting member has at least one cross-sectional dimension greater than the width of the leg of the shaped aperture, thereby preventing "pull out" of the shaped member and separation of the joint. The dimensions of the shaped aperture may be equal to slightly smaller than the dimensions of the shaped member to provide a tight, friction or interference fit to prevent sliding movement of the connecting member relative to the aperture when the joint is assembled.

For example, a shaped connecting member may have a cross-section with a generally rectangular neck joined to a cylindrical section having a diameter greater than the width of the neck. The corresponding aperture or slot has a corresponding cross-section with a rectangular leg opening into a cylindrical opening having a diameter greater than the width of the leg. When the shaped member is inserted into the aperture or slot the cylindrical portion of the shaped member prevents "pull out" of the shaped member and separation of the joint since the diameter of the cylindrical portion is greater than the width of the rectangular leg of the shaped slot.

Figure 5:
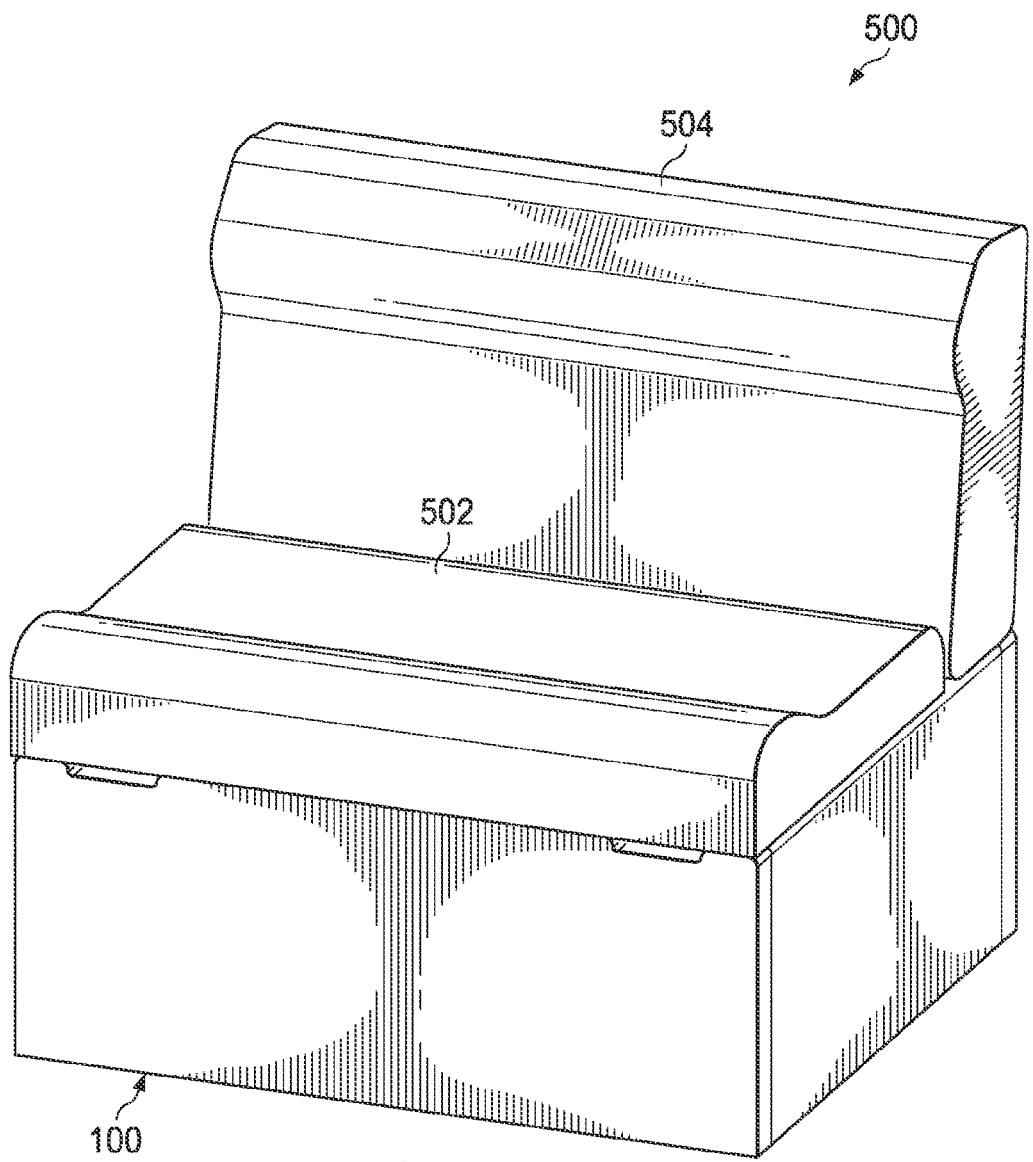
FIG. 5 is a perspective view of an assembled boat seat/base assembly as described herein.

FIG. 5 is a perspective view of a boat seat/base assembly 500 including a boat seat base assembly 100. As will be appreciated, boat seat/base assembly 500 is a bench-type seat particularly adapted for use on relatively flat surfaces such as the deck of a pontoon boat or similar water craft. As illustrated a first cushion or seat 502 is mounted directly to boat seat base assembly 100 and a second cushion or back cushion 504 is also mounted to boat seat base assembly 100. In one embodiment, first cushion 502 is mounted to boat seat base assembly 100 by means of hinges (not shown) such that the space in the interior of the assembled base 100 may be accessed and used for storage.

Figure 6:
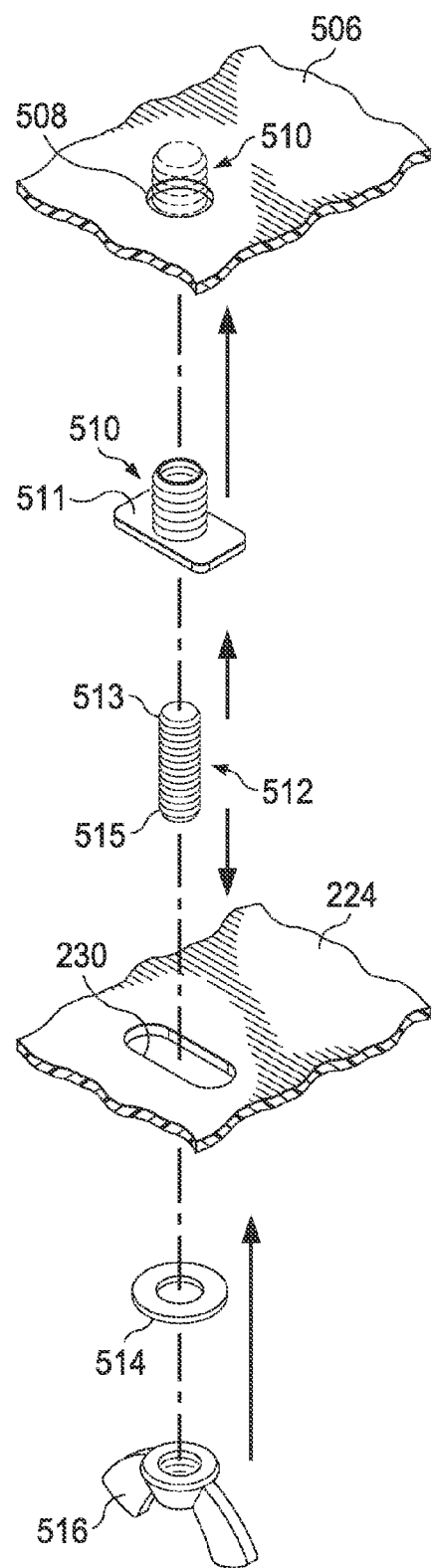
FIG. 6 is a partial exploded view of an attachment system for assembling a boat seat to the base assembly of FIG. 1.

FIG. 6 is an exploded view of a system for attaching a component; for example, back cushion 504 of boat seat/base assembly 500 to base assembly 100. Back cushion 504 is provided with a plastic support base or strip 506 including an aperture 508 formed in the support strip 506 adjacent a longitudinal lower edge of the cushion. A threaded insert or t-nut 510 configured to receive a threaded stud 512 is pressed or driven through aperture 508 until the base 511 of the insert abuts strip 506. In different embodiments, two or more apertures 508 with inserts 510 will be positioned in a plastic base or strip 506 that extends along the length of the bottom of back cushion 504.

After studs 512 have been partially threaded into inserts 510, back cushion 504 may be installed on base 100 by aligning the studs with slots or apertures in the base and pushing the studs into the slot or aperture. In one embodiment, a first end 513 of studs 512 are threaded into inserts 510 to approximately the midpoint of the stud. The second end 515 of each of studs 512 are aligned with slots 230 of second flange 224 of side panel 200 (FIG. 1) and back cushion 504 is pushed downwardly onto base 100, pushing the studs into and through slots 230, after which a washer 514 and wing nut 516 is threaded onto second end 515 of each of the studs, thereby securing back cushion 504 to base assembly 100. As will be appreciated, this method of assembly allows back cushion 504 to be fastened to the base with few or no tools and facilitates convenient removal and reassembly of the back cushion and base.

However, the use of threaded stud 512 can present problems when the back cushion is installed on the base. If the second end 515 of each of threaded studs 512 is not correctly aligned with a slot 230 or if a slot is slightly undersized, when back cushion 504 is pushed downwardly onto base 100, stud 512 and threaded insert 510 may be pushed upwardly through plastic strip 506. Since plastic strip 506 will normally be covered with a cushioning material and/or a cover, if threaded insert 510 is pushed through the strip, reassembly of the insert with the strip can be difficult or impossible without removing the covering material. Further, the distance that threaded stud 512 is threaded or screwed into threaded insert 510 is largely uncontrolled. For example, stud 512 could be threaded into strip 506 less than or greater than an optimum distance, especially when the stud is assembled with the insert hastily or without attention to detail. This, in turn, may cause difficulty when assembling back cushion 504 with base assembly 100.

Figure 7:
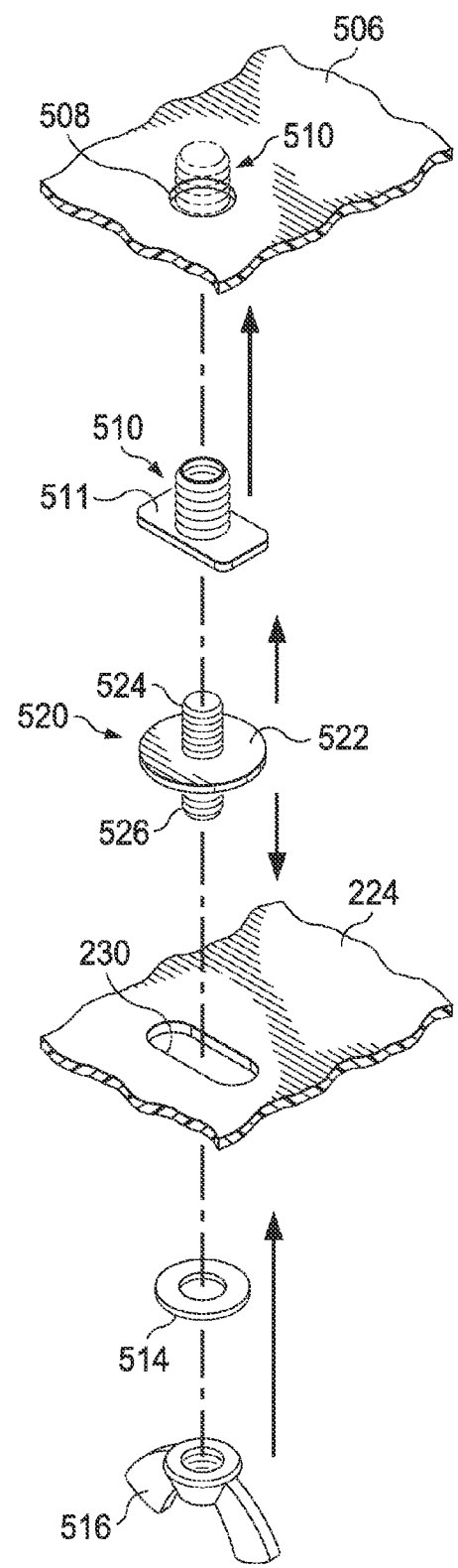
FIG. 7 is a partial exploded view of an alternate system for assembling a boat seat assembly to the base assembly of FIG. 1.

FIG. 7 is an exploded view of an alternative system for attaching back cushion 504 of boat seat/base assembly 500 to base assembly 100. As illustrated, threaded stud 512 has been replaced with an alternative threaded stud 520 that includes a collar or flange 522 positioned midway between threaded first and second ends 524, 526 of the stud. In different variations, collar 522 may be located at different positions along the length of stud 520, depending upon the particular dimensions of the component to be attached to base assembly 100. In this embodiment, stud 520 is first screwed into threaded insert 510 until collar 522 abuts base 511 of the threaded insert. Back cushion 504 is then installed on base assembly 100 as described above.

Figure 8:
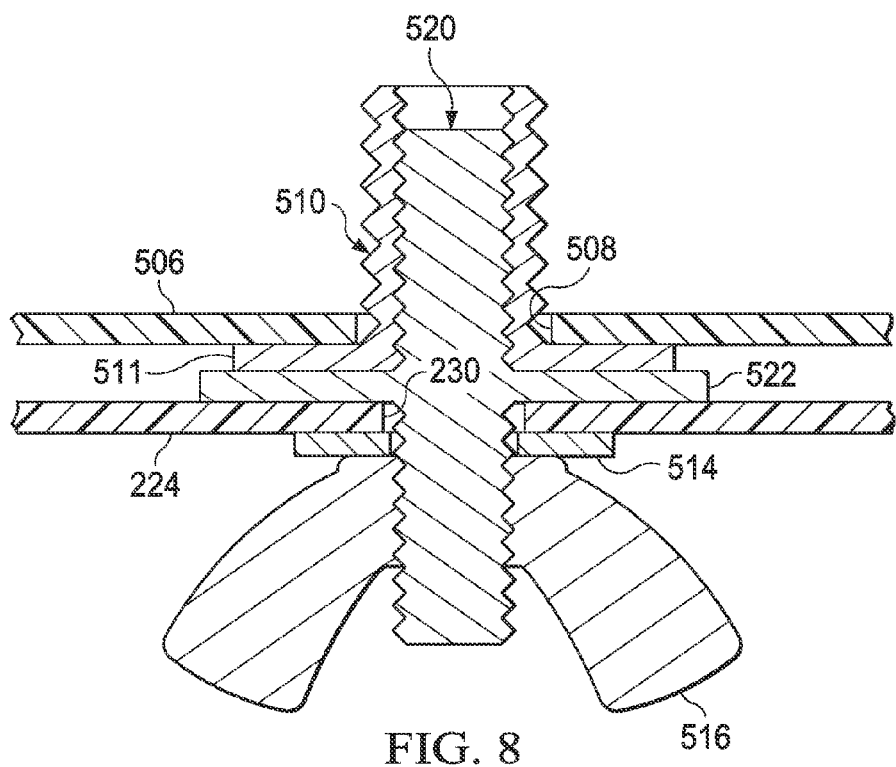
FIG. 8 is a cross-sectional view of the system of FIG. 7 in an assembled state.

FIG. 8 is a cross-sectional view illustrating the system for attaching back cushion 504 to base assembly 100 after assembly. In one embodiment, the diameter of collar 522 is selected to be greater than the diameter of the base of threaded insert 510 so as to provide increased load bearing area against strip 506 when second end 526 (FIG. 7) of stud 520 is pressed through slot 230 of flange 224 of side panel 200. The increased load bearing area largely or completely eliminates the problems encountered with push through of threaded insert 510 described above. The use of alternative stud 520 with collar 522 also provides a means of insuring that the stud is threaded into insert 510 the desired distance, since the stud can only be threaded into the insert to the collar, which is positioned at the desired position along the length of the stud.

It will be appreciated by those skilled in the art having the benefit of this disclosure that the boat seat base assembly described herein provides a strong, rigid base for a boat seat that may be conveniently and rapidly assembled with few or no tools. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A boat seat, comprising:
 a base assembly including:
  a pair of opposed side panels and a pair of opposed end panels, at least one of the panels including a connecting flange and at least one slot formed therein, wherein each of the opposed side panels and opposed end panels includes a flange having an angled end positioned in abutting relationship with the angled end of an adjacent side or end panel, and wherein each of the end panels is joined to the side panels by means of shaped connecting members formed in one of the side panels and end panels and shaped apertures formed in other of the side panels and end panels wherein the shaped connecting members are slideably received in the shaped apertures;
  a bench cushion and a back cushion including a support strip positioned adjacent a longitudinal lower edge of the back cushion, the support strip including at least one aperture;
  a threaded insert positioned in the aperture;
  at least one connecting stud, the connecting stud including first and second threaded portions and a collar formed around the stud midway along the length of the stud between the first and second threaded portions;
  wherein the first threaded portion of the connecting stud is received in the threaded insert and the second portion of the connecting stud is received in the slot and secured therein with a nut engaged with the second portion of the connecting stud; and
  whereby the collar is positioned between the support strip and the connecting flange and wherein the collar prevents push through of the threaded insert past the connecting flange.

2. The boat seat of claim 1 further comprises a washer positioned around the second portion of the connecting stud between the nut and the connecting flange.

3. The boat seat of claim 1, wherein the side panels are connected to the end panels with an interference fit between the shaped connecting members formed in one of the side panels and end panels and shaped apertures formed in one of the side panels and end panels.

4. The boat seat of claim 1 further comprising at least one interior support panel extending between the side panels wherein the interior support panel is joined to the side panels by means of shaped connecting members formed in one of the side panels and support panels and shaped apertures formed in one of the side panels and support panels wherein the shaped connecting members are slideably received in the shaped apertures.

5. The boat seat of claim 4, wherein the at least one interior support panel is connected to the side panels with an interference fit between shaped end members of the support panels and shaped apertures of the side panels.

6. A base assembly for a boat seat, comprising:
a pair of opposed side panels, each of the side panels including:
a planar outer surface, a planar inner surface, an upper edge, a lower edge and opposed end edges;
a first flange having an upper surface and a lower surface and extending continuously along the upper edge of the side panel, the first flange having a first width D1 and extending perpendicular to and away from the planar outer surface;
a second flange spaced apart from the first flange, the second flange extending longitudinally between the end edges of the sidewalls parallel to the first flange and having an upper surface, a lower surface and a first edge joined to the planar inner surface of the side panel, the second flange having a second width D2, greater than D1, and extending perpendicular to and away from the planar outer surface, the second flange having an outer edge joined to the planar inner surface of the side panels and at least two, spaced apart, shaped apertures, each having a first leg extending into the second flange from the inner edge thereof and a second portion joined to the first leg whereby the first leg opens into the second portion to form the shaped aperture in the second flange;
at least two spaced apart supports aligned vertically with the spaced apart apertures of the second flange, each of the supports including first and second spaced apart support walls, the first and second support walls extending perpendicular to the second flange between the second flange and the lower edge of the side panel, each of the supports including a plurality of cross members extending between and perpendicular to the support walls, the cross members each having a shaped aperture comprising a first leg extending into the cross members from the third edge and a second portion joined to the first leg whereby the first leg opens into the second portion to form the shaped aperture whereby the shaped apertures of the cross members are aligned with the shaped apertures of the second flange for receiving a shaped member therethrough;
side support pillars joined to the side panel end edges, each of the side support pillars including a shaped aperture extending from an upper end of the side support pillar to a lower end wall of the side support pillar, the aperture including a first leg extending into the end support pillar from an inner side thereof and a second portion joined to and extending perpendicular to the first leg whereby the first leg opens into the second portion to form a continuous, longitudinally extending shaped opening wherein the shaped openings of the side support pillars open upwardly to receive a shaped member therethrough;
a pair of opposed end panels, each of the opposed end panels including:
a planar outer surface, a planar inner surface, an upper edge, a lower edge and opposed end edges;
a first flange having an upper surface and a lower surface and extending continuously along the upper edge of the end panel, the first flange having a first width D1 and extending perpendicular to and away from the planar outer surface of the end panel;
a second flange spaced apart from the first flange, the second flange extending longitudinally between the end edges of the end panel parallel to the first flange and having an upper surface, a lower surface and a first edge joined to the planar inner surface of the end panel, the second flange having a second width D2, greater than D1, and extending perpendicular to and away from the planar outer surface, the second flange having an inner edge joined to the planar inner surface of the end panel wherein the distance between the upper surface of the first flange and the upper surface of the second flange is D3, the second flange having an outer edge, and angled end edges between the inner edge and outer edge, the second flange including a plurality of spaced apart slots, the slots extending parallel to the inner edge of the second flange;
end support pillars extending between the upper and lower edges of the end panel, each of the end support pillars including a shaped end member joined to and extending along the length of the opposed end edges of the end panel, each of the shaped end members having a neck joined to and extending from the end edges of the end panel along the length thereof and a second portion joined to and extending from the neck along the length thereof, whereby the shaped end member has a shaped cross-section with dimensions corresponding to the dimensions of the shaped openings of the side support pillars of the side panels whereby the side panels are connected to the end panels when the shaped end members of the end panels are received in the shaped openings of the side support pillars of the side panels; and
a plurality of interior support panels, each of the interior support panels having:
an upper wall, a lower wall and opposed side walls, the interior support panels each including opposed shaped end members joined to and extending along the opposed sidewalls of the interior support member, each of the shaped end members having a neck joined to and extending from the lower portion of the sidewall along the length thereof and a second portion joined to and extending from the neck along the length thereof, whereby the shaped end member has a shaped cross-section with dimensions corresponding to the dimensions of the shaped openings of the cross members and the shaped opening of the second flange whereby the side panels are connected by the interior support panels when the shaped end members of the interior support panels are received in the shaped openings of the cross members and the shaped opening of the second flange.

7. The base assembly for a boat seat of claim 6, wherein the interior support panels further comprises a planar support wall extending between and joined to, the upper wall, the lower wall and opposed side walls continuously along the edges of the planar support wall.

8. The base assembly for a boat seat of claim 6, wherein the opposed side walls of the interior support panels each have a lower portion and an indented upper portion and a connecting wall extending perpendicular to and joined to the lower portion of the side wall and the indented upper portion of the side wall at opposed ends thereof.

9. The base assembly for a boat seat of claim 6, wherein the second flange of each of the side panels and the second flange of the end panels each include angled end edges whereby the angled end edges of the second flange of the side panels and the second flange of the end panels are positioned in substantially abutting relationship when the base assembly is assembled.

10. The base assembly for a boat seat of claim 6, wherein the side panels are connected to the end panels with an interference fit between the shaped end members of the end panels and the shaped openings of the side support pillars of the side panels.

11. The base assembly for a boat seat of claim 6, wherein side panels are connected by the interior support panels with an interference fit between the shaped end members of the interior support panels and the shaped opening of the second flange.

12. A base assembly for a boat seat, comprising:
a pair of opposed side panels, each of the side panels including:
a planar outer surface, a planar inner surface, an upper edge, a lower edge and opposed end edges;
a first flange having an upper surface and a lower surface and extending continuously along the upper edge of the side panel, the first flange having a first width D1 and extending perpendicular to and away from the planar outer surface, the upper edge and first flange of the side panel including at least two spaced apart recessed portions separated by linear non-recessed portions of the upper edge and first flange, the spaced apart recessed portions extending along co-extensive portions of the upper edge and first flange, each of the recessed portions including a horizontal bottom wall extending parallel to non-recessed portions of the upper edge and first flange, each of the spaced apart recessed portions including angled connecting walls extending between the bottom wall of the recessed portion and the non-recessed portions of the upper edge and first flange;
a second flange spaced apart from the first flange, the second flange extending longitudinally between the end edges of the sidewalls parallel to the first flange and having an upper surface, a lower surface and a first edge joined to the planar inner surface of the side panel, the second flange having a second width D2, greater than D1, and extending perpendicular to and away from the planar outer surface, the second flange having an outer edge joined continuously along the length thereof to the planar inner surface wherein the distance between the upper surface of the non-recessed portion of the first flange and the upper surface of the second flange is D3, the second flange having an inner edge, and angled end edges between the inner edge and outer edge, the second flange including a plurality of spaced apart slots, the slots extending parallel to the inner edge of the second flange and at least two, spaced apart, shaped apertures, each having a first leg extending into the second flange from the inner edge thereof and a second portion joined to the first leg whereby the first leg opens into the second leg to form a shaped opening in the second flange;
at least two spaced apart supports, each including first and second spaced apart support walls, the first and second support walls extending perpendicular to the second flange between the second flange and the lower edge of the side panel, the spaced apart support walls each having an upper edge joined to the lower surface of the second flange and a first longitudinal edge joined to the planar inner surface of the side panel, a second longitudinal edge extending parallel to the first longitudinal edge and a lower edge extending perpendicular to and between the first and second longitudinal edges of the support wall, the spaced apart supports each having a bottom wall joined to the planar inner surface of the side panel along the length thereof and the lower edges of the support walls along the length thereof, the bottom wall extending continuously between the lower edges of the support walls, each of the supports including a plurality of cross members extending between and perpendicular to the support walls, the cross members having a first edge joined to the inner planar surface of the side panel, opposed second edges joined to the support walls and a third edge, the cross members each having a shaped aperture comprising a first leg extending into the cross member from the third edge and a second portion joined to and perpendicular to the first leg whereby the first leg opens into the second portion to form a shaped opening whereby the shaped openings of the cross members are aligned with the shaped opening of the second flange for receiving a shaped member therethrough;
side support pillars joined to the side panel end edges along the length thereof and extending between the upper and lower edges of the side panel, each of the side support pillars including a shaped aperture extending from an upper end of the side support pillar to a lower end wall of the side support pillar, the aperture including a first leg extending into the end support pillar from an inner side thereof and a second portion joined to and extending to the first leg whereby the first leg opens into the second portion to form a continuous, longitudinally extending shaped opening wherein the shaped openings of the side support pillars open upwardly to receive a shaped member therethrough;
a pair of opposed end panels, each of the opposed end panels including:
a planar outer surface, a planar inner surface, an upper edge, a lower edge and opposed end edges;
a first flange having an upper surface and a lower surface and extending continuously along the upper edge of the end panel, the first flange having a first width D1 and extending perpendicular to and away from the planar outer surface of the end panel;
a second flange spaced apart from the first flange, the second flange extending longitudinally between the end edges of the end panel parallel to the first flange and having an upper surface, a lower surface and a first edge joined to the planar inner surface of the end panel, the second flange having a second width D2, greater than D1, and extending perpendicular to and away from the planar outer surface, the second flange having an inner edge joined continuously along the length thereof to the planar inner surface wherein the distance between the upper surface of the first flange and the upper surface of the second flange is D3, the second flange having an outer edge, and angled end edges between the inner edge and outer edge, the second flange including a plurality of spaced apart slots, the slots extending parallel to the inner edge of the second flange;

end support pillars extending between the upper and lower edges of the end panel, each of the end support pillars including a shaped end member joined to and extending along the length of the opposed end edges of the end panel, each of the shaped end members having a neck joined to and extending from the end edges of the end panel along the length thereof and a second portion joined to and extending from the neck along the length thereof, whereby the shaped end member has a substantially shaped cross-section with dimensions corresponding to the dimensions of the shaped openings of the side support pillars of the side panels whereby the side panels are connected by the end panels when the shaped end members of the end panels are received in the shaped openings of the side support pillars of the side panels; and a plurality of interior support panels, each of the interior support panels having:

an upper wall, a lower wall and opposed side walls, the opposed side walls each having a lower portion and an indented upper portion and a connecting wall extending perpendicular to and joined to the lower portion of the side wall and the indented upper portion of the side wall at opposed ends thereof, the indented upper portion of the side wall having a height H1 substantially equal to D3, the interior support panels each including opposed shaped end members joined to and extending along the length of the lower portions of the opposed sidewalls of the interior support member, each of the shaped end members having a neck joined to and extending from the lower portion of the sidewall along the length thereof and a second portion joined to and extending from the neck along the length thereof, whereby the shaped end member has a shaped cross-section with dimensions corresponding to the dimensions of the shaped openings of the cross members and the shaped opening of the second flange whereby the side panels are connected by the interior support panels when the shaped end members of the interior support panels are received in the shaped openings of the cross members and the shaped opening of the second flange.

13. The base assembly for a boat seat of claim 12, wherein the side panels are connected to the end panels with an interference fit between the shaped end members of the end panels and the shaped openings of the side support pillars of the side panels.

14. The base assembly for a boat seat of claim 12, wherein side panels are connected by the interior support panels with an interference fit between the shaped end members of the interior support panels and the shaped opening of the second flange.

* * * * *